United States Patent
Jennings

(10) Patent No.: US 7,908,162 B2
(45) Date of Patent: Mar. 15, 2011

(54) METHOD OF DELEGATING ACTIVITY IN SERVICE ORIENTED ARCHITECTURES USING CONTINUATIONS

(75) Inventor: James Scott Jennings, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 1049 days.

(21) Appl. No.: 11/247,696

(22) Filed: Oct. 11, 2005

(65) Prior Publication Data

US 2007/0083875 A1    Apr. 12, 2007

(51) Int. Cl.
G06F 9/46    (2006.01)
G06F 9/45    (2006.01)
G06F 9/44    (2006.01)

(52) U.S. Cl. ............... 705/8; 717/136; 719/330
(58) Field of Classification Search ............ 705/8, 9; 717/104, 136; 718/100; 719/330
See application file for complete search history.

(56) References Cited

U.S. PATENT DOCUMENTS

| | | | | |
|---|---|---|---|---|
| 5,987,422 A * | 11/1999 | Buzsaki | ................ | 705/9 |
| 6,205,469 B1 * | 3/2001 | Graham | ................ | 709/203 |
| 6,385,639 B1 | 5/2002 | Togawa | ................ | 709/200 |
| 6,529,907 B1 | 3/2003 | Terakura et al. | ................ | 707/9 |
| 6,742,099 B1 | 5/2004 | Mendoza et al. | ................ | 711/173 |
| 6,760,910 B2 | 7/2004 | Eilert et al. | ................ | 718/104 |
| 6,823,346 B2 | 11/2004 | MacLellan et al. | ................ | 707/104.1 |
| 6,832,260 B2 | 12/2004 | Brabson et al. | ................ | 709/230 |
| 7,246,319 B2 * | 7/2007 | Alden et al. | ................ | 715/738 |
| 2001/0052016 A1 | 12/2001 | Skene et al. | ................ | 709/226 |
| 2002/0178148 A1 * | 11/2002 | Sobel et al. | ................ | 707/3 |
| 2002/0194324 A1 | 12/2002 | Guha | ................ | 709/223 |
| 2004/0230973 A1 | 11/2004 | Cundiff, Jr. et al. | ................ | 718/1 |
| 2005/0166183 A1 * | 7/2005 | Brown et al. | ................ | 717/114 |
| 2005/0210455 A1 * | 9/2005 | Koehler et al. | ................ | 717/136 |
| 2006/0074736 A1 * | 4/2006 | Shukla et al. | ................ | 705/8 |
| 2006/0095274 A1 * | 5/2006 | Phillips et al. | ................ | 705/1 |
| 2006/0143686 A1 * | 6/2006 | Maes | ................ | 726/1 |

FOREIGN PATENT DOCUMENTS

JP    2004302918    10/2004

OTHER PUBLICATIONS

U.S. Appl. No. 10/933,107, filed Sep. 2, 2004, Genkin et al., Method, System and Program Product for Recording and Replaying Target Service Interaction Data.

* cited by examiner

*Primary Examiner* — H. S. Sough
*Assistant Examiner* — Charles E Anya
(74) *Attorney, Agent, or Firm* — Jordan IP Law, PC

(57) ABSTRACT

A computer implemented method of delegating activities in a service oriented architecture of distributed computing systems. An activity specification is defined. The activity specification contains a set of service invocations. The activity specification is transformed into continuation passing style to form an activity. The activity is then executed using an activity execution engine.

16 Claims, 14 Drawing Sheets

{ If (GetFragPercentage(EP) > 0.45) then Defragment(EP); } is equivalent to

{ GetFragPercentage_CPS(EP, temp_function); } where

GetFragPercentage_CPS(endpoint, k) =
  { k(GetFragPercentage(endpoint); } temp_function(percentage) =
  {if (percentage > 0.45) then Defragment(EP); }

FIG. 14

```
Delegate (EntityList) =
   Call-with-current-continuation
     { lambda (k)
        { map
           {lambda (Entity)
              remote-execute (k, Entity);
              exit();
           }
          EntityList
     }
```

FIG. 15

{ If (GetFragPercentage(EP) > 0.45) then Defragment(EP); }

Might compile into 3 routines:

```
// Routine: 0
LOAD-ADDRESS r0 #{Address 1 0 r0}
LOAD-literal r1 <binding for EP>
LOAD-literal r2 ()
LOAD/cons r1 r2 r1
SAVE-REGISTERS (save-regs k-reg env-reg)
LOAD-args-reg r1
LOAD/JUMP r0 #{Address 0 8 r0}
RESTORE-REGISTERS
HALT r0

// Routine: 2
LOOKUP donothing r0
LOAD-literal r1 ()
SAVE-REGISTERS (save-regs k-reg env-reg)
LOAD-args-reg r1
LOAD/JUMP r0 #{Address 2 6 r0}
RESTORE-REGISTERS
JUMP/LOAD r0
```

```
// Routine: 1
EXTEND-ENV (ep) args-reg env-reg
LOOKUP > r0
LOOKUP getfragpercentage r1
LOOKUP ep r2
LOAD-literal r3 ()
LOAD/cons r2 r3 r2
SAVE-REGISTERS (save-regs k-reg env-reg r0)
LOAD-args-reg r2
LOAD/JUMP r1 #{Address 1 10 r1}
RESTORE-REGISTERS
LOAD-literal r2 0.45
LOAD-literal r3 ()
LOAD/cons r2 r3 r2
LOAD/cons r1 r2 r1
SAVE-REGISTERS (save-regs k-reg env-reg)
LOAD-args-reg r1
LOAD/JUMP r0 #{Address 1 18 r0}
RESTORE-REGISTERS
TEST r0
BRANCH-ON-FALSE #{Address 2 0 ignore}
LOOKUP defragment r0
LOOKUP ep r1
LOAD-literal r2 ()
LOAD/cons r1 r2 r1
SAVE-REGISTERS (save-regs k-reg env-reg)
LOAD-args-reg r1
LOAD/JUMP r0 #{Address 1 28 r0}
RESTORE-REGISTERS
JUMP/LOAD r0
```

FIG. 16

METHOD OF DELEGATING ACTIVITY IN SERVICE ORIENTED ARCHITECTURES USING CONTINUATIONS

BACKGROUND OF THE INVENTION

1. Field of the Invention

The present invention relates generally to an improved data processing system and in particular to a computer implemented method and apparatus for processing data. Still more particularly, the present invention relates to a computer implemented method, apparatus, and computer usable program code for delegating activities in service oriented architectures using continuation passing style programming techniques.

2. Description of the Related Art

Managing large distributed computing systems, such as a large network maintained by a large business, can be daunting. The large number of data processing systems connected to the network means that managing the network, the individual data processing systems on the network, and the myriad programs on those data processing systems is very difficult. In addition, even large businesses may call upon the services of an external distributed computing system to handle overflow work or to perform certain management tasks on the home distributed computing system. Managing tasks between multiple distributed computing systems further increases the difficulty of managing networks and performing tasks in these environments. A method of managing tasks and data processing systems in these environments is to use service oriented architectures.

Service oriented architectures have two key elements, including the fact that units of functionality are expressed via a service interface which hides the implementations of those functions and the fact that applications are built by combining services in some way. For the latter element, the term "combining" could mean calling several services sequentially, or using the results of one service to build the arguments for another service call, or any other service or service invocation. Service oriented architectures are characterized by the use of service invocations as the basic building block for distributed systems, whether those systems are loosely coupled or tightly coupled. A service invocation is a call for a service to be performed. Examples of service invocations include simple service invocations, such as instructions to get the current time in UTC; or service invocations to, given a metric unit of measure, produce the equivalent English system of measure. Other examples of service invocations include more complex service invocations, such as instructions to, given an item number, produce the quantity of that item which is stocked in a warehouse or retail store; or instructions to, given a list of items and a customer account number, place an order with a retail enterprise for those items on behalf of the referenced customer.

The service invocation may be made by the customer and performed by the provider's distributed computing system or the customer's distributed computing system. A service invocation may also be invoked by any other user. Thus, some service oriented architectures exist wholly within an enterprise intranet, or even within a single department at a business, while other service oriented architectures span many networks.

When applications are designed for service oriented architectures, a frequent need arises to delegate a service invocation to a third party. Without delegation, a caller, or a first party, wishes to invoke a service provided by a service provider, or a second party. When a service invocation is delegated to a third party, then the third party invokes the service provided by the second party on behalf of the caller. Thus, delegation is a form of job submission. A manager, or third party, is software or data processing systems to which the service invocations are delegated. The manager provides for quality of service, such as dealing with errors, and may provide a "fan-out" and a "fan-in" capability. A fan-out capability means that the manager can iterate a single service invocation across a number of data processing systems and even a number of providers. A fan-in capability means that the manager can collect results from one or more service invocations performed on one or more data processing systems and even across a number of providers.

A known partial solution for managing large networks and performing delegation of service invocations in service oriented architectures is to use scripts, written in a variety of scripting languages, to perform jobs. A script is a program, usually relatively short, written in any one of a number of programming languages. A job is a task and may be a service invocation. An example of a job is to update software on a data processing system. (The term "job" also retains a historical connotation in computing associated with batch processing.) Thus, scripting languages may be used to specify a pattern of service invocation jobs. However, scripting languages address neither a single delegation of a service invocation, nor uncoupled parallelism in the distribution of service invocations and the collection of results of service invocations.

Another class of partial solutions is the use of workflow languages to manage a large network and the individual data processing systems connected to the network. These tasks may be performed as a result of a service invocation. Workflow programs provide instrumentation and control of service invocations, but like scripting languages, do not provide for uncoupled parallelism in the distribution of service invocations and the collection of results of service invocations.

Furthermore, these and other existing approaches to delegation of service invocations are designed on an ad-hoc basis and are not based on a sound computational model that relates the concept of a service invocation to the concept of delegation. No known method is able to: (1) specify a unit of computation for delegation which is larger than a single service invocation, and which may also be a combination of service invocations; (2) delegate multiple service invocations or combinations thereof in order to obtain both quality of service and fan-out and fan-in behavior; (3) instrument a manager in order to measure progress or performance of the execution of multiple service invocations or combinations thereof; (4) control the execution of multiple service invocations or combinations thereof by selectively pausing, resuming, or canceling one or more of the service invocation combinations; and (5) migrate one or more executing combinations of service invocations to a different manager. Thus, an improved computer implemented method, apparatus, and computer usable program code has been developed to perform delegation of multiple service invocations or combinations thereof in service oriented architectures.

BRIEF SUMMARY OF THE INVENTION

The present invention provides a computer implemented method, apparatus, and computer usable program code for delegating activities in a service oriented architecture of distributed computing systems. An activity specification is defined. The activity specification contains a set, or combination, of service invocations. The activity specification is transformed into continuation passing style to form an activity. The activity is then executed using an activity execution engine.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 14 is an example of pseudo-code transformed into continuation passing style, in accordance with an illustrative embodiment of the present invention;

FIG. 15 is an example of pseudo-code defining delegation for multiple targets, in accordance with an illustrative embodiment of the present invention; and FIG. 16 is an example of pseudo-code of a machine code program which utilizes continuation passing style, in accordance with an illustrative embodiment of the present invention.

DETAILED DESCRIPTION OF THE INVENTION

Figure 1:
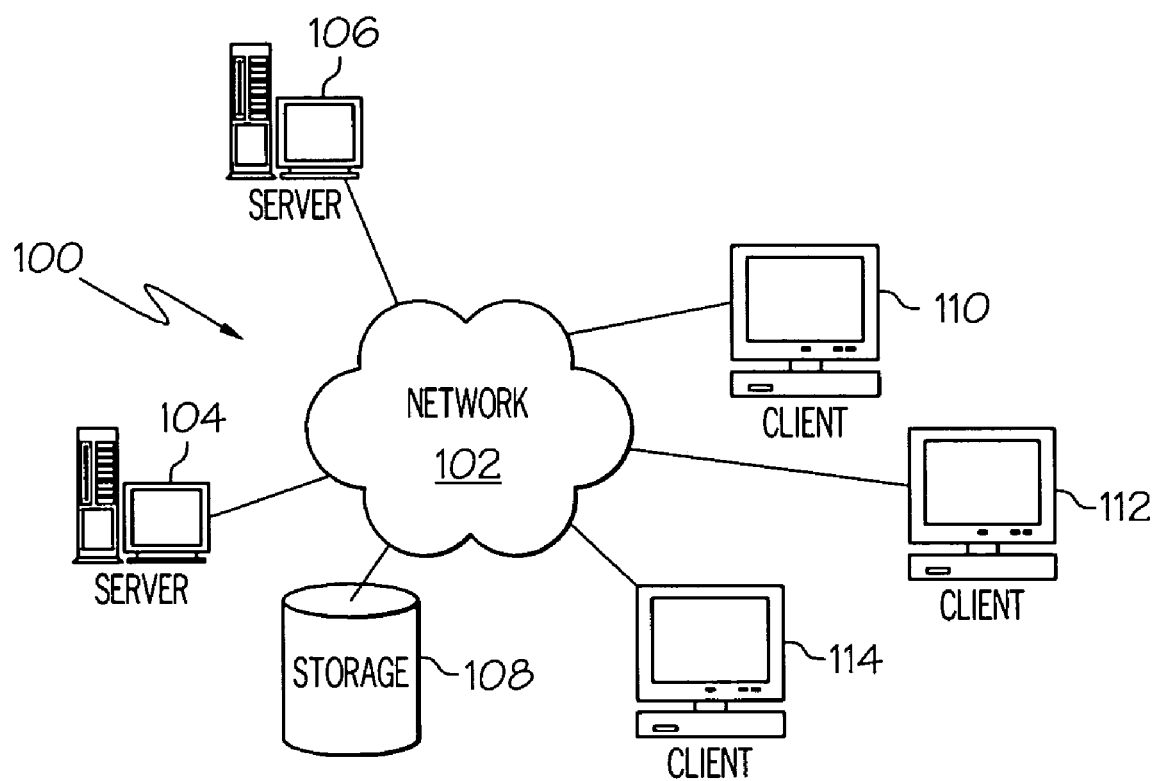
FIG. 1 is a pictorial representation of a network of data processing systems in which aspects of the present invention may be implemented.
Figure 2:
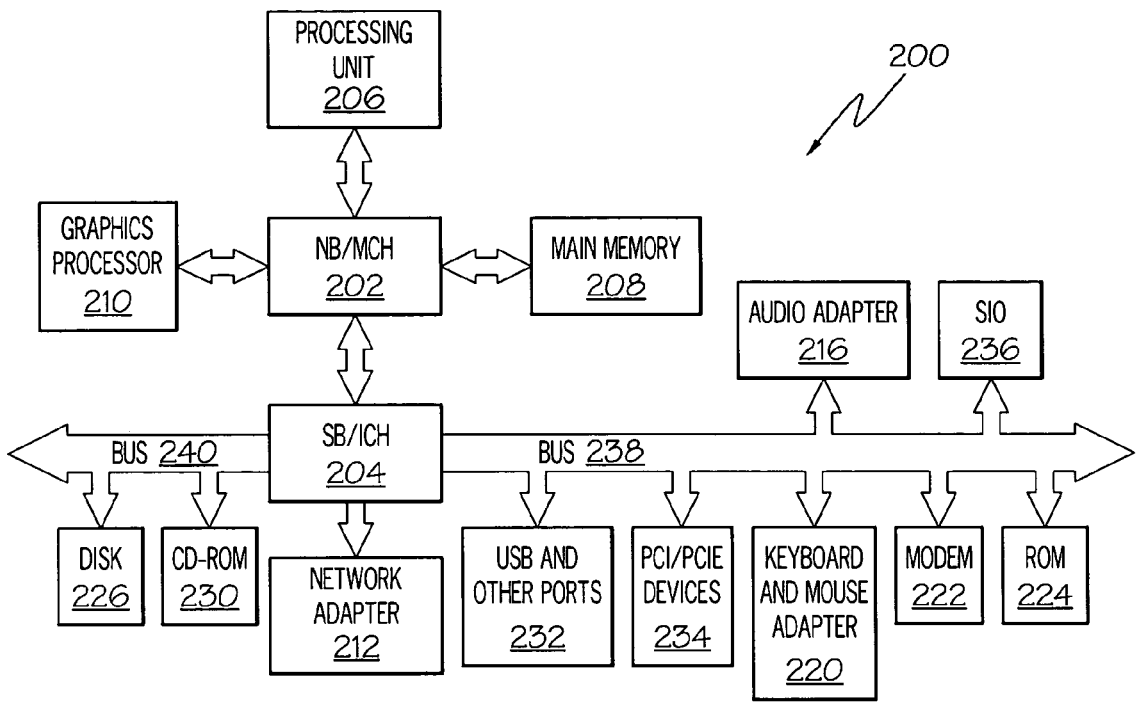
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
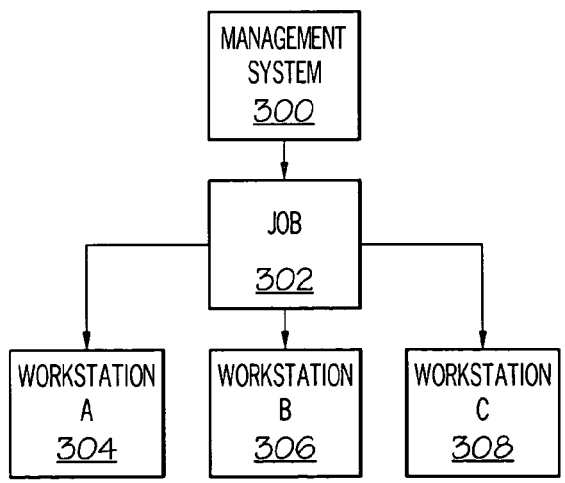
FIG. 3 is block diagram of a prior art method of processing a job in a distributed computing environment.

FIG. 3 is block diagram of a prior art method of processing a job in a distributed computing environment. A distributed computing environment includes a network, such as network 102 of FIG. 1 and a number of data processing systems, such as data processing system 200 in FIG. 2. Management system 300 causes job 302 to be processed on a number of workstations: workstation A 304, workstation B 306, and workstation C 308. Management system 300 may use a script or a workflow to distribute job 302 to each of workstations 304, 306, and 308. Job 302 may be a script or workflow which executes on each of these workstations.

However, the method shown in FIG. 3 has a number of drawbacks. For example, many management actions are not coordinated across multiple machines. Thus, job 302 cannot be paused during execution on workstation A 304, migrated to workstation B, and then continue execution on workstation B 306. Similarly, the results of job 302 in workstations 304, 306, and 308 are not coordinated by management system 300. In another example, if job 302 is delegated to another, separate, management system, no unit of computation for delegation exists which is larger than a single service invocation or job. Thus, multiple service invocations are not coordinated. In another example, if additional jobs or service invocations are performed, management system 300 does not measure progress or performance of the execution of the jobs or service invocations. In another example, no means is provided to migrate job 302 to a second management system. However, the novel techniques described below overcome all of these disadvantages.

Figure 4:
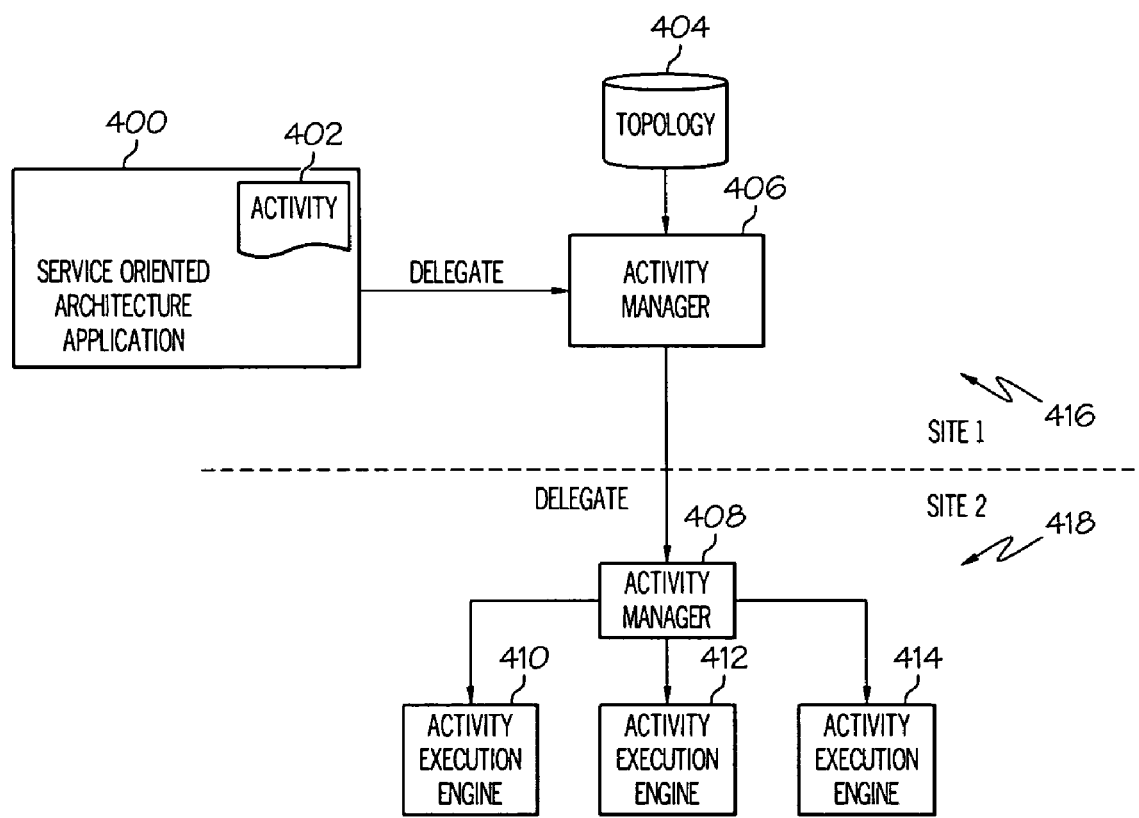
FIG. 4 is a block diagram of activity delegation in a distributed computing environment, in accordance with an illustrative embodiment of the present invention.

FIG. 4 is a block diagram of activity delegation in a distributed computing environment, in accordance with an illustrative embodiment of the present invention. Service oriented architecture application 400 designates activity 402 for delegation to activity manager 406. Service oriented architecture 400 and activity manager 406 generally exist at a geographical location designated by site A 416. Each of Site A 416 and Site B 418, described further below, includes a network, such as network 102 of FIG. 1 and a number of data processing systems, such as servers 104 and 106 and clients 110, 112, and 114 in FIG. 1 and data processing system 200 in FIG. 2.

A service oriented architecture application is an application designed for use with service oriented architectures. Examples of service oriented architecture applications include the Tivoli® series of applications for use in distributed computing environments. Tivoli® applications are available from International Business Machines Corporation. Other examples of service oriented architecture applications include web services applications, such as Websphere® available from International Business Machines Corporation.

An activity, such as activity 402, is a set of service invocations written as a set of programs, scripts or workflows which are generated or invoked by service oriented architecture application 400. However, an activity may be any set of service invocations performed by other applications in a service oriented architecture. An activity is distinct from the traditional term "job" in that the emphasis on parallelism is missing from the historical uses of the term "job." The new term "activity" in the context of the present invention is used to denote the delegation and distribution of service invocations in a service oriented architecture. In the illustrative embodiments, an activity is based on a sound computational model, as described further below in relation to FIG. 6 through FIG. 8.

In relation to workflows as used in many enterprise applications, activities are orthogonal to workflows in that workflows and activities may be used independently of each other. Defining a workflow is heavyweight scripting suitable for composing applications requiring the collaboration of multiple people distributed throughout an enterprise. Workflows add features such as parallelism, heterogeneity, distribution, and context-dependency to the notion of scripting. The implementation overhead inherent in these features is why this kind of scripting is "heavyweight." Activities, on the other hand, are lightweight in that any data processing system in the distributed computing network can execute an activity and in that heavyweight scripting is not required for defining activities. Thus, the delegator of an activity could be a workflow. A workflow can delegate service invocations which spawn other workflows instead of spawning activities. Similarly, services invoked within an activity may create a workflow. Most generally, workflow is directed to sequencing and coordination of tasks. Activity delegation with a fan-out function is directed to uncoupled parallelism.

Figure 6:
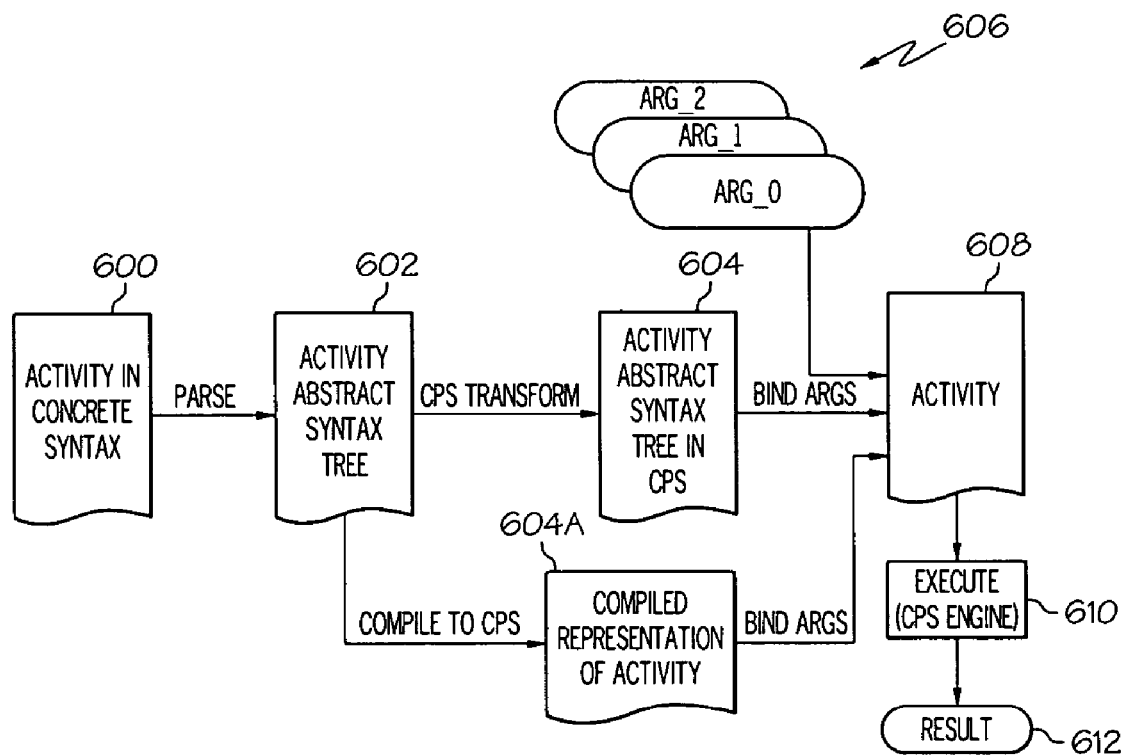
FIG. 6 is a block diagram of activity programming entities, in accordance with an illustrative embodiment of the present invention.
Figure 7:
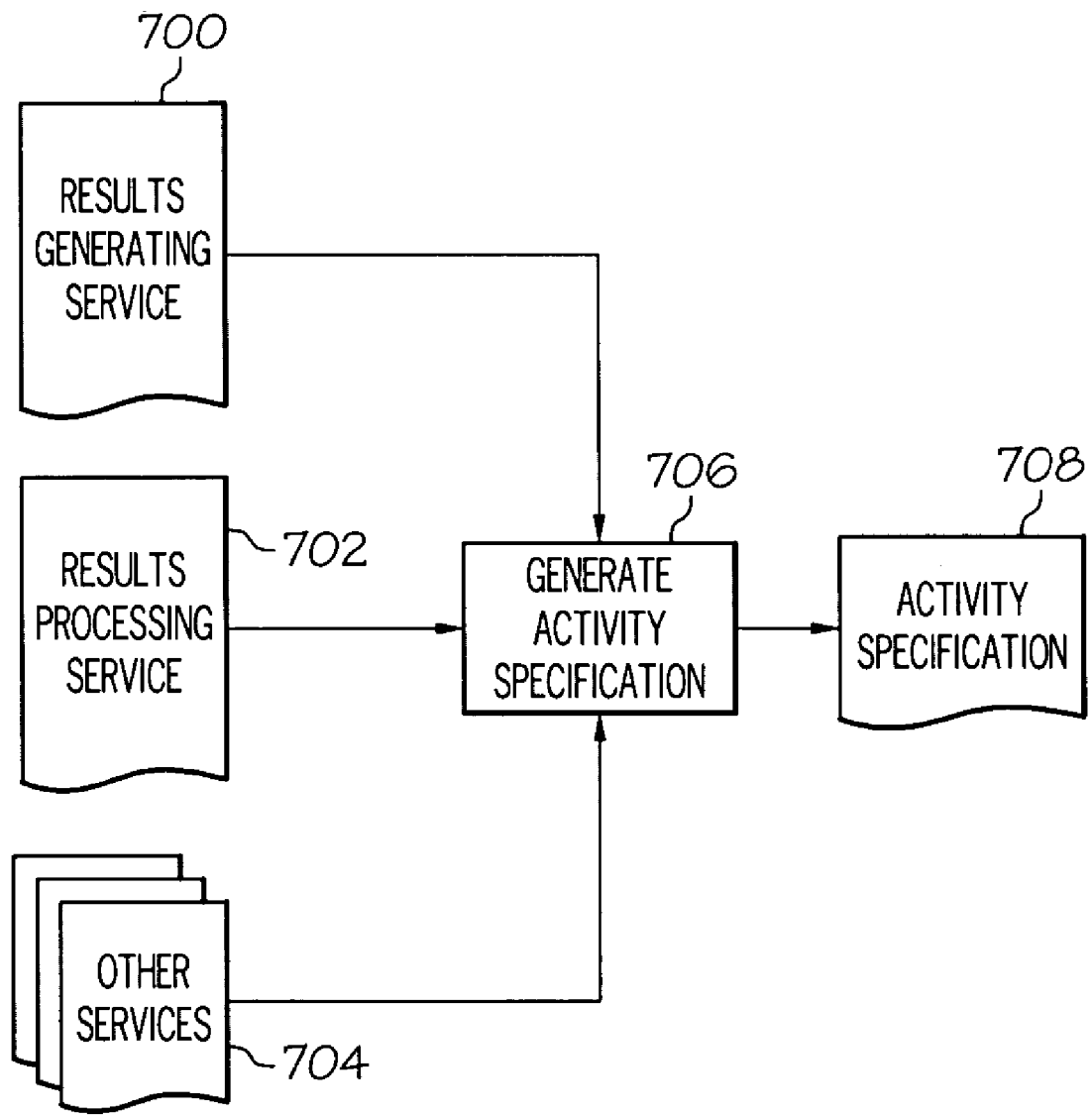
FIG. 7 is a block diagram of construction of an activity specification, in accordance with an illustrative embodiment of the present invention.
Figure 8:
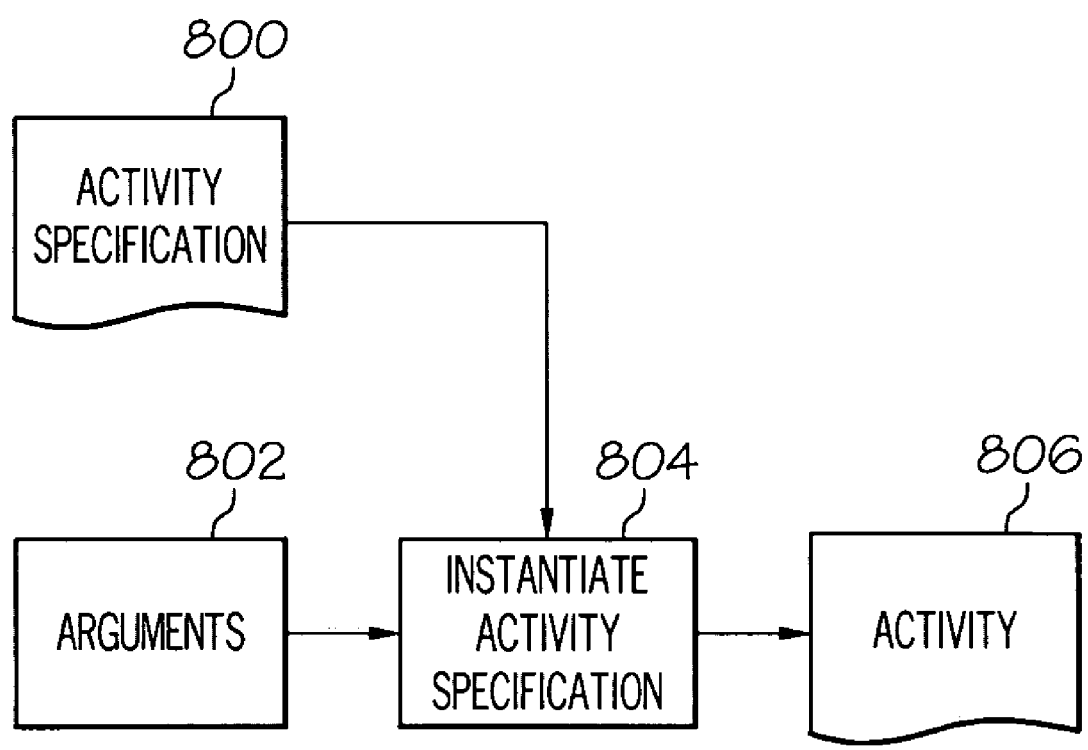
FIG. 8 is a block diagram of construction of an activity from an activity specification, in accordance with an illustrative embodiment of the present invention.

In addition, delegation of an activity, such as delegation of activity 402 to activity manager 406, is distinct from a service invocation. A service invocation is a service call. The call returns with the results and execution of the caller continues. Delegation of an activity, as shown further with respect to FIG. 6 through FIG. 8, is defined by communicating the activity to an activity manager, which may delegate the activity to another activity manager, or instead communicate the activity to an activity engine for execution. Two alternative techniques for producing efficient and flexible delegation are:

(1) converting the pattern of service invocations into continuation passing style, and the communication of the continuation passing style application to an activity manager with the expected eventual invocation of that continuation passing style application; or (2) communicating the activity to an activity manager whose implementation utilizes the continuation passing style internally.

A service invocation has the semantics of "apply," or of a function application. On the other hand, delegation has the semantics of a remote execution of a continuation, where the continuation passing style program is explicitly passed. Activities, therefore, have the property that they are able to be represented in continuation passing style programming, as described in relation to FIG. 14. On the other hand, a delegation returns nothing of interest. A delegation may be implemented to return a success code if the communication to the activity manager succeeds and a failure code otherwise. However, the results of the activity are not returned because delegation is not the same as a service invocation.

Returning to FIG. 4, activity manager 406 is a program or a data processing system to which service oriented architecture applications can delegate activities. In the illustrative embodiments, activity manager 406 is programmed to use information regarding topology 404. Topology 404 reflects the topology of the distributed data processing environment of Site A 416 and may also reflect the topology of the distributed data processing environment of Site B 418. Generally, a topology of a computer network is the pattern of connections between the machines in the network, such as ring networks, star networks, buts networks, and other network architectures.

Activity manager 406 performs two major functions, quality of service functions and fanning functions. Quality of service functions include re-try logic to overcome transient failures of activity 402 or in the communication of activity 402. Quality of service functions also include verification of the communication of an activity or the receipt of an activity. Activity manager 406 may perform other types of quality of service functions, including scheduling of activities, notification regarding availability of devices or activities, and the capability of pulling activities.

Fanning functions include a fan-out function and a fan-in function. A fan-out function transfers the same activity to multiple endpoints. A fan-in function collects the results of activities that have been fanned out. Thus, activity manager 406 is capable of tracking the status of activities, including activity 402.

Continuing the illustrative example, service oriented architecture application 400 generates activity 402, which is delegated to activity manager 406 at Site A 416. In turn, activity manager 406 delegates activity 402 to a second activity manager, activity manager 408 located generally at geographical location Site B 418. Site B 418 may be a customer location and Site A 416 may be a provider location, where Site B 418 calls upon the services provided by Site A 416. Activity manager 408 then performs a fan-out function to fan activity 402 to multiple execution engines, including activity execution engines 410, 412, and 414. Each activity execution engine, which is a program that is located on a data processing system, executes activity 402.

Activity execution engines 410, 412, and 414 may be located on the same or different data processing systems. Activity execution engines 410, 412, and 414 may take a number of different forms, including those described in relation to FIG. 10 and FIG. 11.

Figure 5:
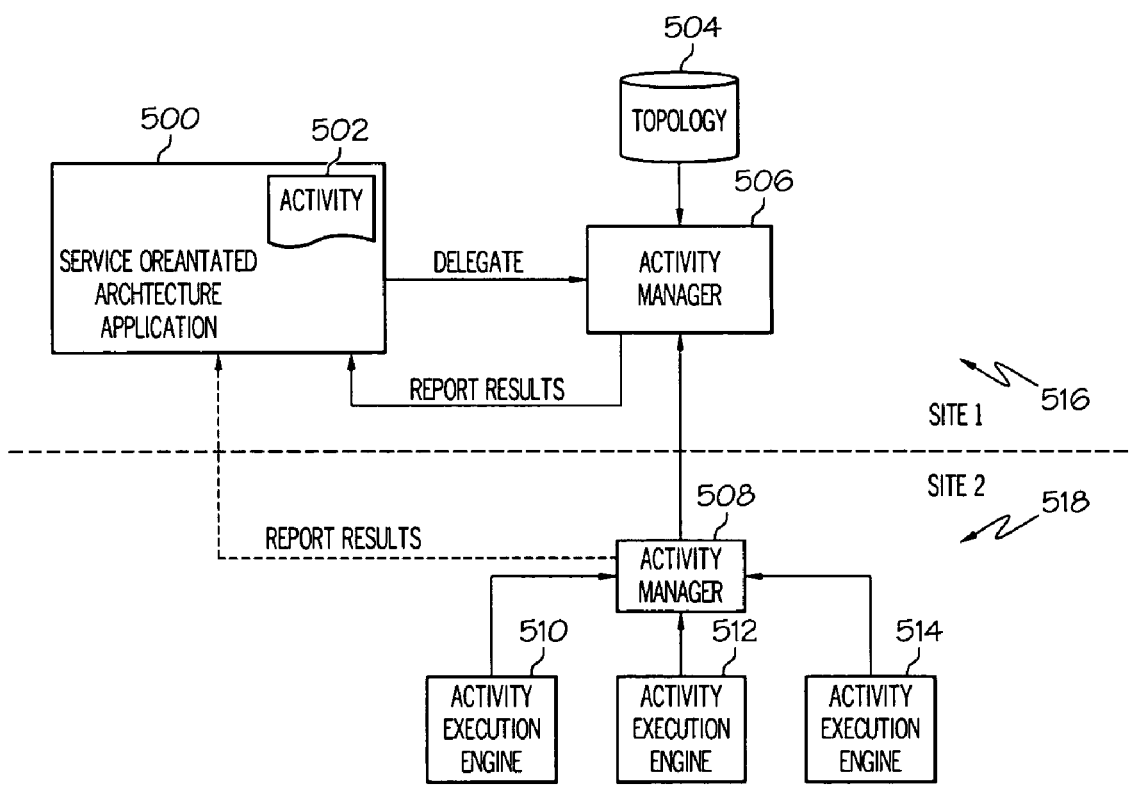
FIG. 5 is a block diagram of activity delegation in a distributed computing environment, in accordance with an illustrative embodiment of the present invention.

FIG. 5 is a block diagram of activity delegation in a distributed computing environment, in accordance with an illustrative embodiment of the present invention. The process shown in FIG. 5 continues the example of operation of activity delegation begun in FIG. 4. Service oriented architecture application 500 corresponds to service oriented architecture application 400, activity 502 corresponds to activity 402, activity manager 506 corresponds to activity manager 406, topology 504 corresponds to topology 404, second activity manager 508 corresponds to second activity manager 408, Site A 516 corresponds to Site A 416, Site B 518 corresponds to Site B 418, and activity execution engines 510, 512, and 514 correspond to activity execution engines 410, 412, and 414 accordingly.

Continuing the example described in FIG. 4, the results of execution of activity 502 in each of activity execution engines 510, 512, and 514 are reported to second activity manager 508. Thus, second activity manager 508 performs a fan-in function to create an aggregated set of results. Second activity manager 508 reports the aggregated set of results to activity manager 506. In turn, activity manager 506 reports the aggregated set of results to service oriented architecture application 500. Instead of, or in addition to, reporting the aggregated set of results to activity manager 506, second activity manager 508 may report the aggregated set of results directly to service oriented architecture application 500.

FIG. 4 and FIG. 5 provide an illustrative example of the overall operation of delegation of activities. FIG. 4 and FIG. 5 also provide an illustrative overview example of the use of activity managers to manage activities and to manage delegation of activities. The creation of an activity, such as activity 402 or 502, will now be described.

FIG. 6 is a block diagram of activity programming entities, in accordance with an illustrative embodiment of the present invention. To create an activity, first the activity is written in concrete syntax, as shown in block 600. The syntax may take the form of a number of programming languages, including Java, Python, Perl, C++, or many other number of programming languages. The process shown in FIG. 6 may be implemented in the environment shown in FIG. 4 and FIG. 5. For example, specifying the activity into concrete syntax may be performed by a user in Site A 416 or may be performed by service oriented architecture application 400 in FIG. 4.

Next, the syntax is parsed into an activity abstract syntax tree, as shown in block 602. The syntax tree breaks the activity syntax into individual components that allow the activity to be automatically translated into another programming language. Parsing the syntax may be performed by a user, such as a user at site B 418, by service oriented architecture application 400, or by some other program or data processing system.

Specifically, the activity syntax tree is either (1) converted into a continuation passing style (CPS) programming format, as shown in block 604, or (2) retained in its current form for eventual execution in an activity engine that utilizes continuation passing style internally. Conceptually, a continuation represents the future of the computation process. Accordingly, continuation passing style programming is a style of programming in which continuations are made explicit. In other words, every function call takes an extra argument which is the function to call with its result, except for primitive operations. In activity delegation, individual service invocations are primitive operations. In continuation passing style programming, functions never return; instead, functions call a continuation with their results. An example of continuation passing style programming is shown in FIG. 14. The transformation of other programming languages into continuation passing style format may be performed by a user, such as a user at site A 416, by service oriented architecture application 400, or a separate program or data processing system.

In another illustrative example, the process of converting or providing an activity syntax tree in continuation passing style, as shown in block 604, is not needed. In this illustrative example, the engine in block 610 utilizes the continuation passing style technique during execution of the activity. An illustrative example of an alternative to the conversion to continuation passing style is to perform a compilation to a continuation passing style, as shown in block 604A. The pseudo-code in FIG. 16 is illustrative of a machine code program which utilizes continuation passing style. Thus, the program does not use a control stack of activation frames.

In the examples shown in FIG. 4 and FIG. 5, the process of delegation is similar to a service invocation that never returns. Processing continues when a call is made to the entity that listens for the result. Thus, continuation passing programming style is a very useful computational model for expressing delegation. In addition, continuations are easily represented and efficiently executed. Furthermore, most programs can be (1) mechanically and automatically transformed into continuation passing style, or (2) executed by an engine that uses continuation passing style internally, as described above.

Activities expressed in continuation passing style or executed using continuation passing style have advantages over traditional jobs written in traditional programming styles. For example, an activity expressed in or executing using continuation passing style may be migrated from one engine to another engine while execution of the activity is in progress and while respecting the service call boundaries that reflect the opacity of web services provided by a service oriented architecture application. Furthermore, activities represented in continuation passing style or executed using continuation passing style can be paused and resumed. In this case, their progress can be measured at continuation boundaries, which is a useful fine-grained measure. Additionally, activities represented in continuation passing style or executed using continuation passing style can be paused and saved, such as to persistent storage, for future resumption. Finally, activities represented in continuation passing style or executed using continuation passing style are amenable to many optimizations, both in pre-processing and during execution, which are derived from the literature on continuation passing style.

Returning to FIG. 6, once the activity has been converted into continuation passing style format, a series of arguments, such as arguments 606 may be bound to the activity. Arguments include any additional instructions, such as a schedule for execution of the activity, the data processing systems to which the activity should be applied, and possibly other arguments such as execution priority or progress instrumentation. Progress instrumentation arguments may indicate that the activity engine should emit data when certain events occur, such as when a continuation is applied, a service invocation returns, or an activity is paused. Similarly, progress instrumentation arguments may indicate that a service is to be invoked by the activity engine when such events occur.

In addition, the conversion to continuation passing style need not be an explicit step. Either the continuation passing style conversion takes place explicitly, or the activity engine can execute using continuation passing style internally.

Figure 9:
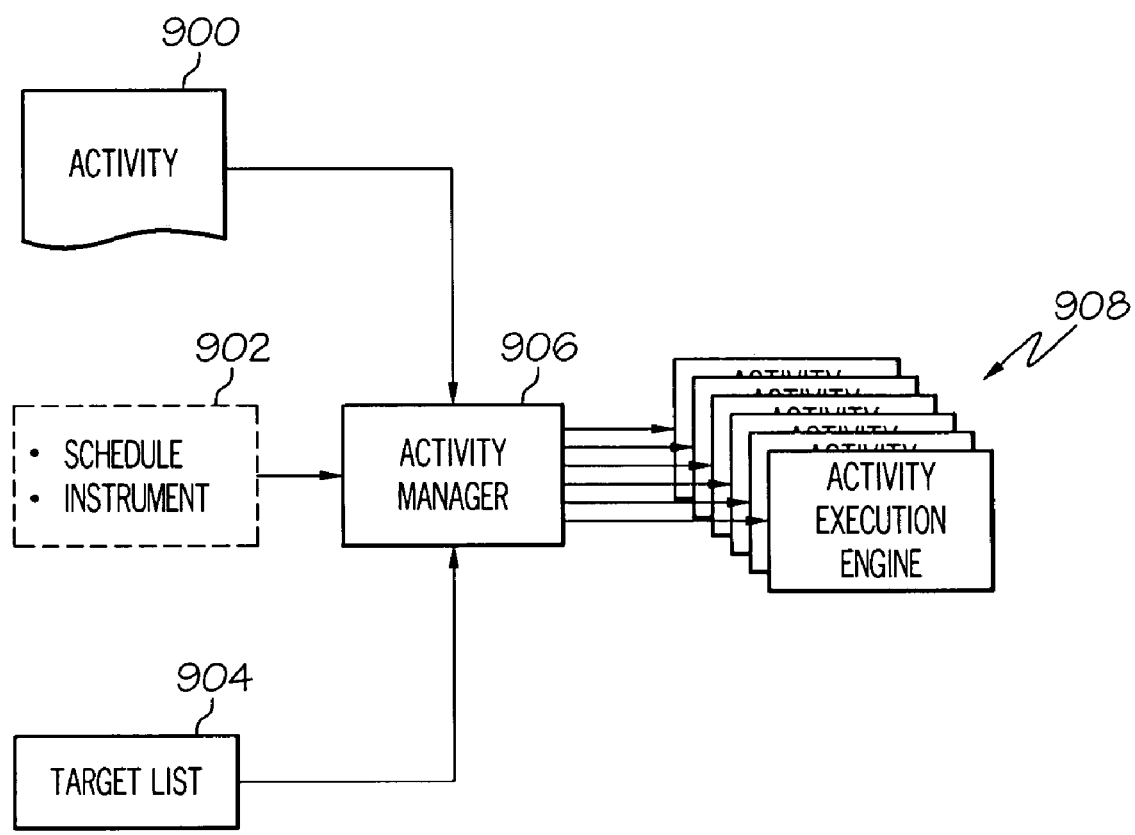
FIG. 9 is a block diagram of use of an activity manager to manage execution of activities in a set of activity execution engines, in accordance with an illustrative embodiment of the present invention.

Next, the activity and associated arguments are passed to activity manager 608, examples of which are described in relation to activity managers 406 and 408 in FIG. 4 and activity manager 906 in FIG. 9. Activity manager 608 may coordinate to which systems an activity is applied, coordinate results, and generally coordinate execution of arguments bound to the activity. Activity manager 608 passes the activity to one or more activity execution engines, which execute the activity as shown in block 610. After an activity is executed, a result is produced, such as result 612. A result may be communicated back to activity manager 608, or may be completed without communication back to activity manager 608. Similarly, the result may or may not be reported to other sites or data processing systems or have an effect on other data processing systems.

FIG. 7 through FIG. 9 are block diagrams illustrating in more detail the process of generating and using activities. FIG. 7 shows generation of an activity specification, FIG. 8 shows creation of an activity from the specification, and FIG. 9 shows management and execution of the activity. The processes shown in FIG. 7 through FIG. 9 may be implemented using the processes and systems shown in FIG. 4 through FIG. 6 and may be executed using data processing systems, such as those shown in FIG. 1 and FIG. 2, or programs.

FIG. 7 is a block diagram of construction of an activity specification, in accordance with an illustrative embodiment of the present invention. An activity specification specifies the type of activity, or the set of service invocations, that ultimately is to be executed by one or more activity execution engines. The activity specification has the property that the results processing service is called with the output of the results generating service. Any other services may be used in the design of the activity. Quality of service requests, such as scheduling, failure contingencies, or targets of the activity, may be part of an activity specification.

In the illustrative example of FIG. 7, results generating service 700, results processing service 702, and other services 704 are used to generate activity specification 706. As described above, activity specification 706 specifies the nature of the activity to be executed. The results generating service is the service whose results should be returned. The results processing service is the service provided as a "call back." Services may include a logging service, a user confirmation service, or any of a great variety of services that might be incorporated into an activity. For example, an activity that checks for and removes "spy-ware" from a computer system may be generated using the following example services:

(1) A corporate spy-ware database, hosted on a corporate server, accepts an operating system as an argument and returns the appropriate spy-ware database reference, which is needed for scanning;

(2) A data synchronization service, hosted on a personal computer system, which accepts a database reference as an argument and ensures that a local copy of that database exists and is identical to the reference copy, and returns a reference to that local copy;

(3) A user confirmation service, hosted on a personal computer system, which accepts as an argument a question to be shown to the computer system user, and which returns the response of the user;

(4) A spy-ware scanning and removal service, hosted on a personal computer system, which accepts as an argument a reference to a local database and returns the results of scanning for and removing spy-ware according to the contents of the referenced database; and (5) A logging service, hosted on a corporate server, which accepts as arguments the identity of a personal computer system and the results of checking and removing spy-ware from that system.

In the terminology of the above illustrative example, the spy-ware scanning and removal service is an example of a results generating service 700; the logging service is an example of a results processing service 702; and the corporate spy-ware database, the data synchronization, and the user confirmation services are examples of other services 704.

Next, activity specification 706 is generated. The process of generating the activity specification may be performed by the service oriented architecture application, may be generated manually by user input, or may be generated both automatically and modified by a user.

The results of generating the activity specification in block 706 are activity specification 708. Activity specification 708 may be an activity in concrete syntax, such as that shown in block 600 of FIG. 6. Activity specification 708 may be expressed using continuation passing style programming techniques. If activity specification 708 is not expressed using continuation passing style programming techniques, then in the illustrative embodiment, activity specification 708 may be converted into continuation passing style, as described in relation to FIG. 6. Alternatively, if activity specification 708 is not expressed using continuation passing style programming techniques, then activity specification 708 may be later executing by an activity engine utilizing continuation passing style programming techniques, as described in relation to FIG. 6.

FIG. 8 is a block diagram of construction of an activity from an activity specification, in accordance with an illustrative embodiment of the present invention. Activity specification 800, which may be activity specification 708 in FIG. 7, combined with arguments 802, which may be arguments 606 in FIG. 6, are combined when instantiating the activity specification as shown in block 804. The activity specification is the specification of the activity to be delegated. As a result of instantiating the activity specification, block 804, an executable activity is produced, as shown in block 806. The activity contains a representation of the set of service invocations to be executed and may include an activity environment, which provides for the context in which the activity is to be executed.

Delegation occurs when an activity is delivered to an activity execution engine, as shown in FIG. 9. The activity may be delivered with additional execution instructions, also as shown in FIG. 9.

FIG. 9 is a block diagram of use of an activity manager to manage execution of activities in a set of activity execution engines, in accordance with an illustrative embodiment of the present invention. Activity 900 is an executable activity, and may be activity 806 in FIG. 8. Activity 900 is provided to activity manager 906, which may be activity manager 608 in FIG. 6, or activity managers 406, 408, 506, and 508 in FIG. 4 and FIG. 5.

In addition, although some quality of service commands may be bound to activity 900, as shown above, other quality of service parameters may be provided to activity manager 906. For example, parameters expressing scheduling and instrumentation, as shown in block 902, may be provided to activity manager 906. In another example, a target list, such as that shown in block 904, may be provided that specifies which data processing systems or programs are targeted by activity 900. Other execution instructions and parameters may also be provided to activity manager 906, such as parameters specifying that certain execution instructions should be passed to one or more individual execution engines.

Activity manager 906 then manages the processing of activity 900. In the illustrative embodiment, activity manager 906 fans-out activity 900 to group 908 of activity execution engines. Group 908 of activity execution engines may be loaded on or a part of one or more data processing systems in one or more distributed data processing environments. In the illustrative embodiment, activity manager 906 fans-out activity 900 to multiple target data processing systems. Each activity execution engine in group 908 executes activity 900 according to the parameters specified in activity 900 and as modified by parameters passed by activity manager 906. In addition, one or more of the activity execution engines may support different sets of execution instructions.

Later, as shown in FIG. 4 and FIG. 5, activity manager 906 may collect the results of execution of activity 900. Furthermore, one or more additional activity managers may be involved in the processing of activity 900 across one or more distributed data processing environments located in one or more geographical locations.

Figure 10:
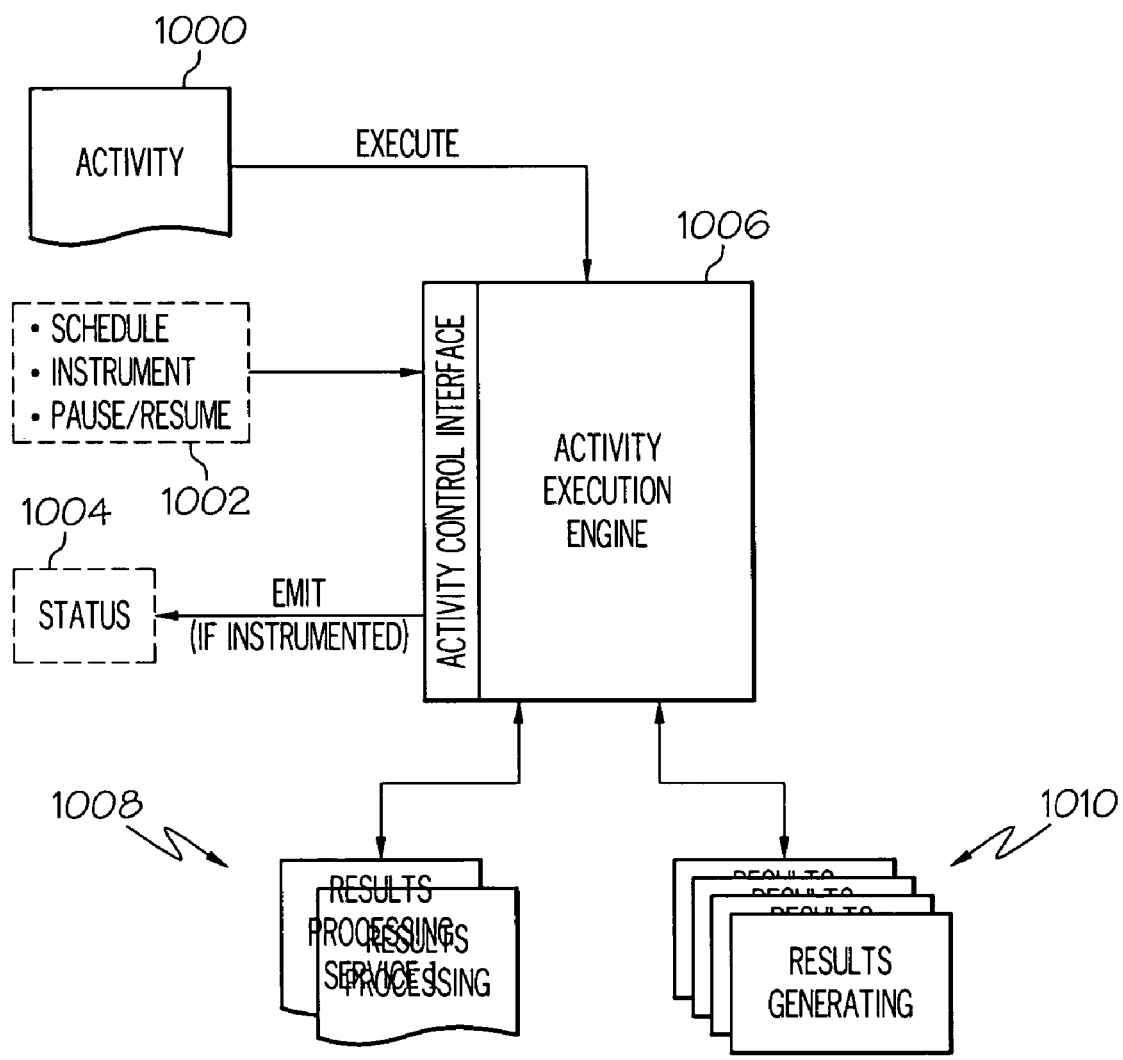
FIG. 10 is a block diagram of operation of an activity execution engine, in accordance with an illustrative embodiment of the present invention.

FIG. 10 is a block diagram of operation of an activity execution engine, in accordance with an illustrative embodiment of the present invention. Activity execution engine 1006 may be one of the activity execution engines shown in group 908 in FIG. 9, or may be any one of the activity execution engines shown in FIG. 4 through FIG. 6.

In the illustrative embodiment shown in FIG. 10, activity execution engine 1006 receives as input activity 1000 and instructions set 1002. Activity 1000 may be any of the activities described in relation to FIG. 4 through FIG. 9. Instructions set 1002 may include instructions related to scheduling, instrumentation, whether and when to pause and resume execution, migration of activities, and other instructions communicated from an activity manager or from some other program or data processing system. In the illustrative embodiment, an activity control interface component operably programmed with activity execution engine 1006 coordinates the execution of activity 1000 with instructions set 1002. If instrumented to do so, the activity control interface component may emit an output, such as status report 1004 or other form of output, or invoke a service to report such output.

After execution of activity 1000 is initiated by activity execution engine 1006, execution proceeds until no service invocations remain in the activity. One or more of the service invocations may generate useful results; while other service invocations may communicate results to a waiting customer. Any kind of results, whether intermediate or final, may be communicated to any service capable of using the results.

In addition, activity 1000 may contain an environment expressed as a set of variables and bindings, either directly to values or to locations containing values. Execution engine 1006 binds the set of variables to the activity when execution begins or resumes. Variables in activities may be used as variables are used in programming, such as to hold and propagate intermediate values, and as constants are used in programming.

For example, an activity refers to a variable called CORPORATE-SERVER. If the corporation is multi-national, then the variable CORPORATE-SERVER may take on the value "123" when the activity executes in the United States, and "456" when the activity executes in France. The activity environment associates the names of variables with their values or, alternatively, with locations containing their values. Entries in the activity environment may be created by arguments 802 of FIG. 8, or may exist a priori, having been created at the time of creation of the activity specification or the activity itself.

An example of flow of the execution of activity 1000 is also shown in FIG. 10. First, activity execution engine 1006 calls activity 1000. In response, group 1010 of results are generated. Group 1010 of results are then communicated back to activity execution engine 1006. Activity execution engine then calls additional instructions along with group 1010 and processes the results to produce group 1008 of processed results. Execution may be terminated, or group of results 1008, may be communicated to activity execution 1006, to a customer, to another activity manager, or to any other service suitable for receiving or using group 1008 of results.

An example of a topology for activity delegation may also be shown in the process shown in FIG. 10. In the illustrative example, a first host, typically one or more servers or managers, contains the service oriented architecture application and generates activity 1000. The first host also receives status 1004 and results processing 1008. On the other hand, a second host, also typically one or more servers or managers, contains the activity execution engine. The second host also handles the generation of the results, group 1010. Hence, most of the services invoked by an activity typically are hosted by the same provider.

Figure 11:
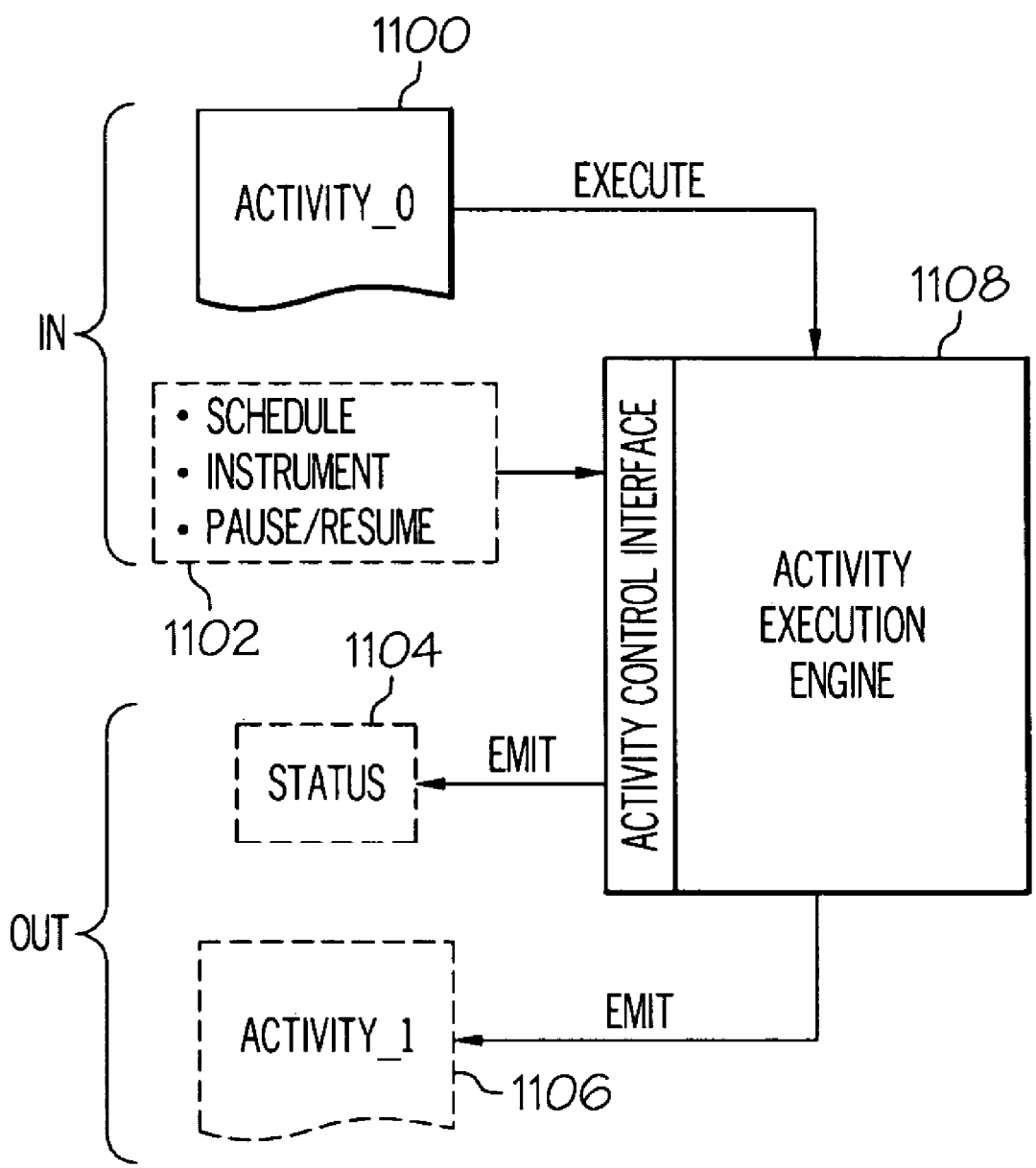
FIG. 11 is a block diagram of operation of an activity execution engine, in accordance with an illustrative embodiment of the present invention.

FIG. 11 is a block diagram of operation of an activity execution engine, in accordance with an illustrative embodiment of the present invention. Activity execution engine 1108 is similar to activity execution engine 1006 in FIG. 10, except the process shown in FIG. 11 shows that an activity may be paused, migrated, or modified by activity execution engine 1108. Thus, activity_0 1100 corresponds to activity 1000 in FIG. 10, group 1102 of instructions corresponds to group 1002 of instructions in FIG. 10, and status 1104 corresponds to status 1004 in FIG. 10.

In the illustrative embodiment, execution of activity_0 1100 may be paused, canceled, or migrated. The ability to pause, cancel, or migrate an activity is possible through the use of the continuation passing style programming techniques described with respect to FIG. 4 and FIG. 5, as well as FIG. 14.

A paused service invocation may be emitted by activity execution engine 1108, depending on instructions provided by the service invocation or by group 1102 of instructions. A migrated service invocation may be similarly emitted by activity execution engine 1108. One or more emitted, paused, or migrated service invocations form one or more additional activities, such as activity_1 1106. Activity_1 may be migrated to one or more additional activity execution engines anywhere within one or more distributed computing environments, including back to activity execution engine 1108. Activity_1 1106 may be migrated through a series of activity execution engines, each of which may modify Activity_1 1106 to produce one or more new activities. Thus, an activity may be paused during execution at activity execution engine 1108, migrated to one or more other activity execution engines, and then resumed in the other activity execution engines. Similarly, an activity may be migrated to one or more additional activity execution engines while the activity is executed in activity execution engine 1108.

Figure 12:
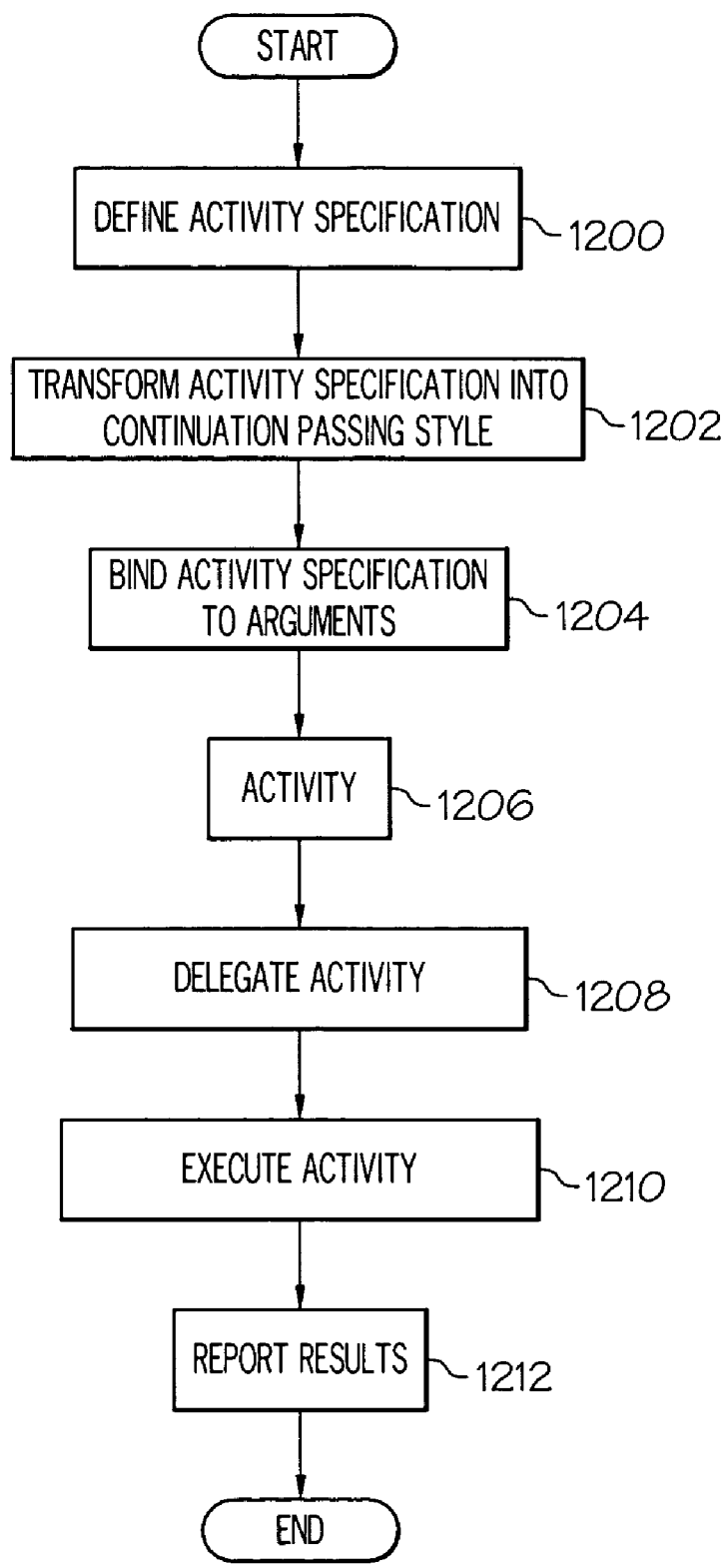
FIG. 12 is a flowchart of delegation of an activity in a service oriented architecture using continuation passing style, in accordance with an illustrative embodiment of the present invention.

FIG. 12 is a flowchart of delegation of an activity in a service oriented architecture using continuation passing style, in accordance with an illustrative embodiment of the present invention. FIG. 12 illustrates an overview of the processes described in relation to FIG. 4 through FIG. 11.

The process begins as a service oriented architecture application or a user defines an activity specification (step 1200). An activity specification is a specification of a set of service invocations. Next, a program, a data processing system, or a user transforms the activity specification into continuation passing style to form a transformed activity specification (step 1202). Note that step 1202 is optional in the case that activity execution step 1210 is conducted using continuation passing style internally, as described in FIG. 6.

By transforming the activity specification into continuation passing style, every function in the activity specification takes an extra argument known as a continuation. Whenever the function would normally return a result to its caller, the function instead returns the result of applying the continuation to the caller. The continuation thus represents the whole of the rest of the computation. Continuation passing style is described with respect to FIG. 4, FIG. 5, and FIG. 14.

Next, a program or data processing system binds the transformed activity specification to one or more optional arguments (step 1204). Each argument defines one or more execution parameters, such as a target list, scheduling of one or more individual service invocations within the activity, or other arguments as described elsewhere herein (step 1204). Binding arguments to the activity specification produces an executable activity (step 1206).

Subsequently, the activity is delegated (step 1208). The activity may be delegated to one or more activity managers. The activity manager may delegate the activity to one or more additional activity managers or to one or more activity execution engines, as shown in FIG. 4 and FIG. 5. The activity may also be delegated directly to one or more activity execution engines without the use of an activity manager.

Subsequently, one or more activity execution engines execute the activity (step 1210). The process of executing the activity may be paused, resumed, or migrated to one or more additional activity execution engines, which then continue execution of the activity until all service invocations in the activity have been processed according to instructions bound to the activity or processed by an activity manager. In addition, one or more activity execution engines may execute one or more individual service invocations within the activity without initially invoking other service invocations within the activity.

After or during execution of the activity, optionally results of the activity or an individual service invocation may be reported (step 1212). An activity execution engine may report results to one or more activity managers, as shown in FIG. 4 and FIG. 5. An activity execution engine may report results directly to other activity execution engines. An activity execution engine may report results directly to a user, a customer data processing system, or to a service oriented architecture application. Step 1212 is optional because an activity execution may simply cause changes such as, for example, logging an event or rebooting a system, without actually reporting any results. In any case, the process terminates thereafter.

As a consequence of reporting results or taking some other action, a service oriented architecture application may define a new activity specification and re-initiate the process shown in FIG. 12. Thus, the process shown in FIG. 12 may be repeated as often as necessary to satisfy the requirements of an activity, a customer, or of a system administrator.

Figure 13:
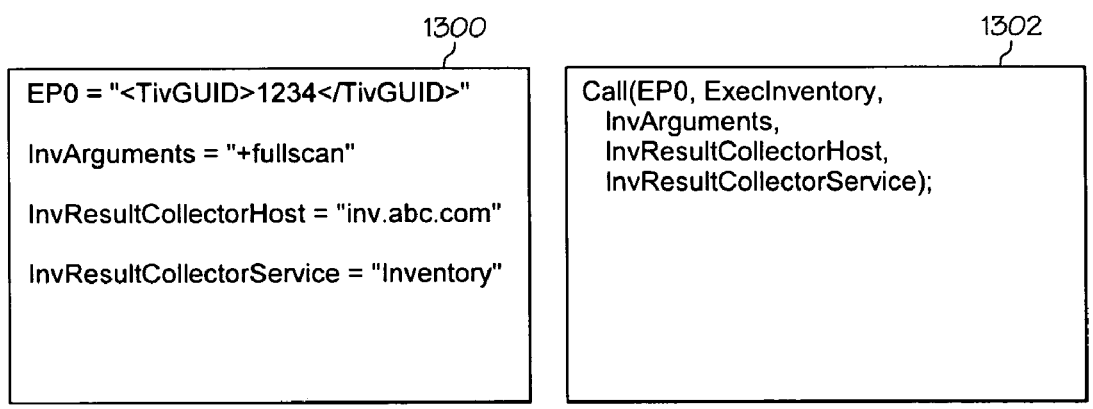
FIG. 13 is an example of an activity specification, in accordance with an illustrative embodiment of the present invention.

FIG. 13 is an example of an activity, in accordance with an illustrative embodiment of the present invention. The activity shown in FIG. 13 may be any activity described in FIG. 1 through FIG. 12. As described above, an activity is a set of service invocations. In the illustrative example shown in FIG. 13, the activity is to perform an inventory of all resources at a web site. The pseudo-code shown in box 1300 shows the environment of the service invocation in box 1302. The pseudo-code shown in box 1302 shows the script of the service invocation. In this example, a single service is invoked on a computer system whose identity is stored in the variable EPO. The service ExecInventory collects information about the hardware and software present in the computer system. The last two arguments, InvResultCollectorHost and InvResultCollectorService, are used by the ExecInventory service when results are ready to be reported.

FIG. 14 is an example of pseudo-code transformed into continuation passing style, in accordance with an illustrative embodiment of the present invention. In the illustrative example of FIG. 14, a command to perform disk defragmentation is transformed into continuation passing style. The term "EP" designates "endpoint," the term "p" designates "GetFragPercentage(EP)," and the term "CPS" designates continuation passing style. The temporary function "k" uses "EP" from the external scope of "GetFragPercentage_CPS," and therefore "k" must be defined within that scope.

An activity specification is similar to the activity shown in FIG. 14. However, in the case of an activity specification, the term "EP" is unassigned. The unassigned variable in the environment obtains values when arguments, if necessary, are combined with the activity specification. When no remaining variables are unassigned, the activity is fully instantiated and is no longer an activity specification.

FIG. 15 is an example of pseudo-code defining delegation for multiple targets, in accordance with an illustrative embodiment of the present invention. The illustrative example shown in FIG. 15 shows code that activity manager, such as activity manager 406 in FIG. 4 and 906 in FIG. 9, may use to fan-out an activity to multiple activity execution engines.

FIG. 16 is an example of pseudo-code of a machine code program which utilizes continuation passing style, in accordance with an illustrative embodiment of the present invention. The illustrative example shown in FIG. 16 shows continuation passing style code that an execution engine, such as activity execution engine 610 in FIG. 6, can execute.

Activity delegation can be related to a number of existing services. For example, in web services applications, web services are atomic in nature. In other words, web services have no intermediate state that is visible from outside the web service application. In this case, an activity is a pattern of invocations written in Web Services Definition Language (WSDL). Activities written in web services definition language have state and may be manipulated, inspected, and migrated to a new host, and otherwise controlled.

In the case of Web Services Choreography (WSC), a web services choreography instance document is an interface description which specifies the possible meaningful patterns of invocations of a particular set of web services. However, web services choreography documents are not executable. On the other hand, an activity is a program which may conform to a web services choreography instance document in that the activity instantiates one or more meaningful patterns. Thus, activities in a web services choreography environment are executable. The web services choreography instance document may be used as input to programs which generate activities or to systems which seek to validate an activity definition.

Thus, activities and activity delegation may be used in a wide variety of service oriented architectures and extended enterprise environments. For example, activities and activity delegation may be used in web services addressing, web services flow language, web services agreements, web services resource frameworks, and may be used for data center management functions. The exact programming language and arguments used to form activities, as well as the nature of the activity managers and activity execution engines may vary depending on the exact nature of the service oriented architecture application used. However, continuation passing style programming techniques should be used, whatever programming language is selected.

The present invention of creating and delegating activities in service oriented architectures solves several problems present in the prior art. For example, the present invention allows sets or patterns of service invocations to be paused, migrated, and resumed across a number of activity execution engines. Thus, the present invention provides a method of performing tasks in an uncoupled parallel manner across a number of data processing systems and across one or more distributed data processing environments. Accordingly, if a particular service invocation in an activity is blocked, the service invocation can be migrated to another host and resumed without interrupting other service invocations associated with the activity. Simultaneously, results of the other service invocations can begin evaluation, and even partial results of the blocked service invocation can begin evaluation using the method of the present invention because the caller receives "call backs" with the results and processes results as they are available.

Activity delegation is particularly suited to situations in which a "fan out" function is desired. The results of each delegated activity may be stored and queried later by some other process. For example, a different service may record results in a database as the results become available.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, or store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Thus, memory elements such as RAM, ROM, and various other forms of memory may be storage devices connected to a bus.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of delegating activities, the method comprising:
    defining an activity specification, said activity specification comprising a set of service invocations for use in a service oriented architecture having units of functionality that are expressed via a service interface that hides implementation of that functionality;
    transforming the activity specification into continuation passing style to form an activity, wherein the activity specifies at least one unit of computation for delegation that is larger than a single service invocation and whenever a function in the activity would normally return a result to its caller, the function instead returns a result of applying a continuation to the caller;
    transmitting the activity to an activity manager before executing the activity, the activity manager configured to fan-out the activity to two or more activity execution engines, wherein the fan-out is based on parameters specified in the activity; and
    executing the activity using the two or more activity execution engines.

2. The method of claim 1 wherein the step of transforming further comprises:
    binding arguments to the activity.

3. The method of claim 1, further comprising:
    using the activity manager to manage the activity according to a set of execution instructions.

4. The method of claim 1 further comprising:
    continuing execution of the activity until no service invocations remain in the activity.

5. The method of claim 1 wherein:
    a set of results is generated as a consequence of executing the activity.

6. The method of claim 5 wherein:
    the set of results is communicated to one of a user, a file, and a program.

7. The method of claim 1 further comprising:
    pausing execution of a first service invocation in the set of service invocations.

8. The method of claim 7 further comprising:
    pausing execution of at least one additional service invocation in the set of service invocations.

9. The method of claim 7 further comprising:
    resuming execution of the first service invocation.

10. The method of claim 7 further comprising:
    migrating the activity to a second activity execution engine and resuming execution of the first service invocation on the second activity execution engine.

11. The method of claim 1 further comprising:
    canceling execution of a first service invocation in the set of service invocations.

12. The method of claim 11 further comprising:
    canceling execution of at least one additional service invocation in the set of service invocations.

13. The method of claim 1 wherein:
    the activity comprises a client management operation.

14. The method of claim 13 wherein:
    the client management operation comprises updating software on at least one client data processing system operably connected to a network.

15. A non-transitory computer readable storage medium comprising:
    a computer program product having computer usable program code for delegating activities, said computer program product including:
    computer usable program code for defining an activity specification, said activity specification comprising a set of service invocations for use in a service oriented architecture having units of functionality that are expressed via a service interface that hides implementation of that functionality;
    computer usable program code for transforming the activity specification into continuation passing style to form an activity, wherein the activity specifies at least one unit of computation for delegation that is larger than a single service invocation and whenever a function in the activity specification would normally return a result to its caller, the function instead returns a result of applying a continuation to the caller;
    computer usable program code for transmitting the activity to an activity manager before executing the activity, the activity manager configured to fan-out the activity to two or more activity execution engines, wherein the fan-out is based on parameters specified in the activity; and
    computer usable program code for executing the activity the two or more activity execution engines.

16. A data processing system comprising:
    a bus;
    a storage device connected to the bus, wherein a set of instructions is located in the storage device;

a processor operably connected to the bus, wherein the processor executes the set of instructions to:

define an activity specification, said activity specification comprising a set of service invocations for use in a service oriented architecture having units of functionality that are expressed via a service interface that hides implementation of that functionality;

transform the activity specification into continuation passing style to form an activity, wherein the activity specifies at least one unit of computation for delegation that is larger than a single service invocation and whenever a function in the activity specification would normally return a result to its caller, the function instead returns a result of applying a continuation to the caller;

transmit the activity to an activity manager before executing the activity, the activity manager configured to fan-out the activity to two or more activity execution engines, wherein the fan-out is based on parameters specified in the activity; and execute the activity using the two or more activity execution engines.

* * * * *